United States Patent
Park

(10) Patent No.: US 11,549,560 B2
(45) Date of Patent: Jan. 10, 2023

(54) CALIPER BRAKE

(71) Applicant: MANDO CORPORATION, Pyeongtaek-si (KR)

(72) Inventor: Jintack Park, Seongnam-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 139 days.

(21) Appl. No.: 16/952,176

(22) Filed: Nov. 19, 2020

(65) Prior Publication Data

US 2021/0207668 A1     Jul. 8, 2021

(30) Foreign Application Priority Data

Jan. 3, 2020   (KR) .................. 10-2020-0001047

(51) Int. Cl.
  *F16D 65/00*   (2006.01)
  *F16D 55/226*  (2006.01)
  *F16D 55/00*   (2006.01)

(52) U.S. Cl.
  CPC ..... *F16D 65/0075* (2013.01); *F16D 55/2262* (2013.01); *F16D 2055/002* (2013.01)

(58) Field of Classification Search
  CPC ............... F16D 55/226; F16D 55/2262; F16D 55/2265; F16D 55/227; F16D 65/0075; F16D 2055/002
  USPC .......................... 188/71.1, 72.4, 73.39, 73.45
  See application file for complete search history.

(56) References Cited

U.S. PATENT DOCUMENTS

| | | | | | |
|---|---|---|---|---|---|
| 4,775,033 | A | * | 10/1988 | Heibel | F16D 65/092 188/73.31 |
| 5,279,394 | A | * | 1/1994 | Wollenweber | F16D 55/226 188/73.43 |
| 10,816,053 | B2 | * | 10/2020 | Yokoyama | F16D 65/0971 |
| 10,913,433 | B2 | * | 2/2021 | Yokoyama | B60T 1/065 |
| 2021/0207668 | A1 | * | 7/2021 | Park | F16D 55/2262 |

FOREIGN PATENT DOCUMENTS

| | | | | | |
|---|---|---|---|---|---|
| DE | 3636379 | C2 | * | 5/1995 | ........... F16D 55/227 |
| DE | 10131324 | A1 | * | 7/2002 | ....... F16D 55/22655 |
| GB | 2176258 | A | * | 12/1986 | ....... F16D 55/22655 |
| KR | 100395856 | B1 | * | 8/2003 | ............... B60T 1/06 |
| KR | 20090061645 | A | | 6/2009 | |
| KR | 20110125137 | A | | 11/2011 | |
| KR | 20130134557 | A | | 12/2013 | |
| KR | 20150128273 | A | | 11/2015 | |

* cited by examiner

*Primary Examiner* — Thomas J Williams
(74) *Attorney, Agent, or Firm* — Harvest IP Law LLP

(57) ABSTRACT

Disclosed is a caliper brake including a carrier on which a pair of pad plates composed of an inner pad plate and an outer pad plate is mounted to advance and retreat, and a caliper housing slidably mounted on the carrier and provided with a cylinder part in which a piston is installed to be advance and retreat by a braking hydraulic pressure, a finger part bent downward for pressing of the outer pad plates, and a body part connecting the cylinder part and the finger part.

13 Claims, 8 Drawing Sheets

[Fig. 1]
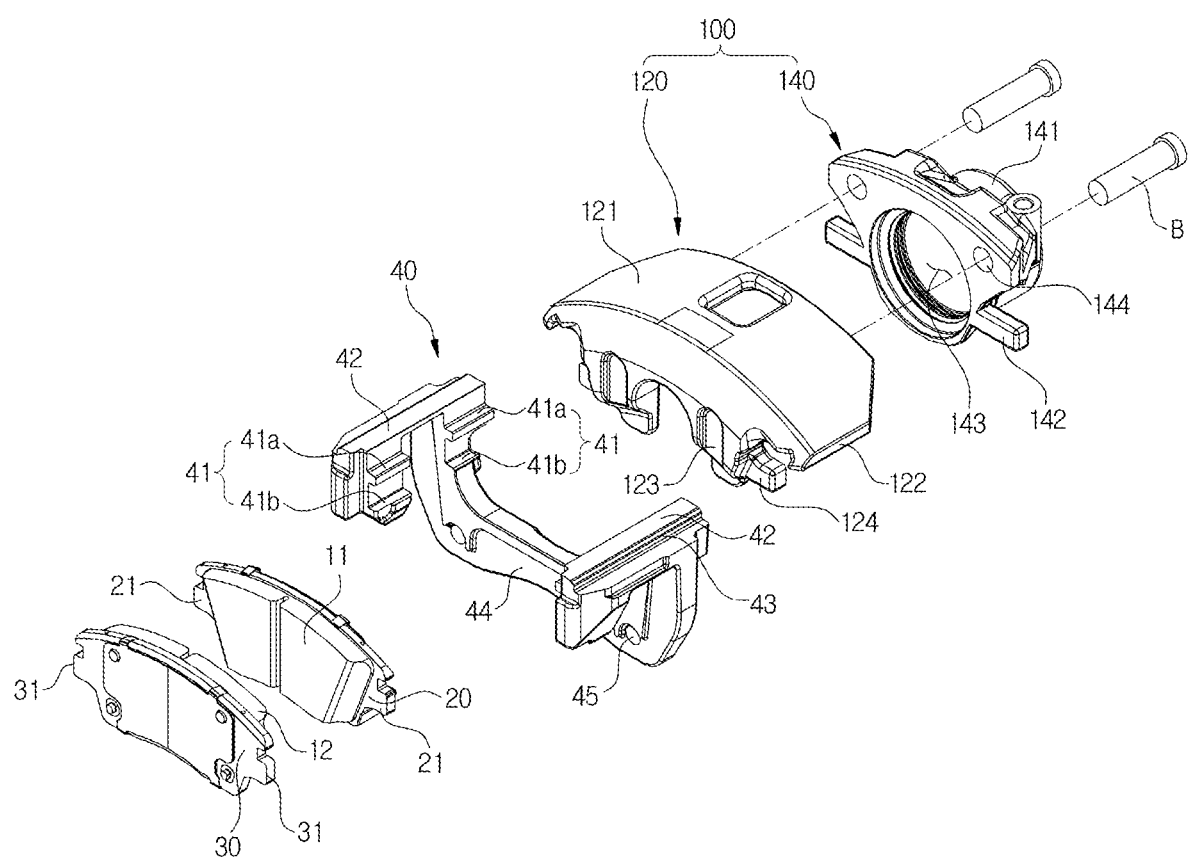

[Fig. 2]
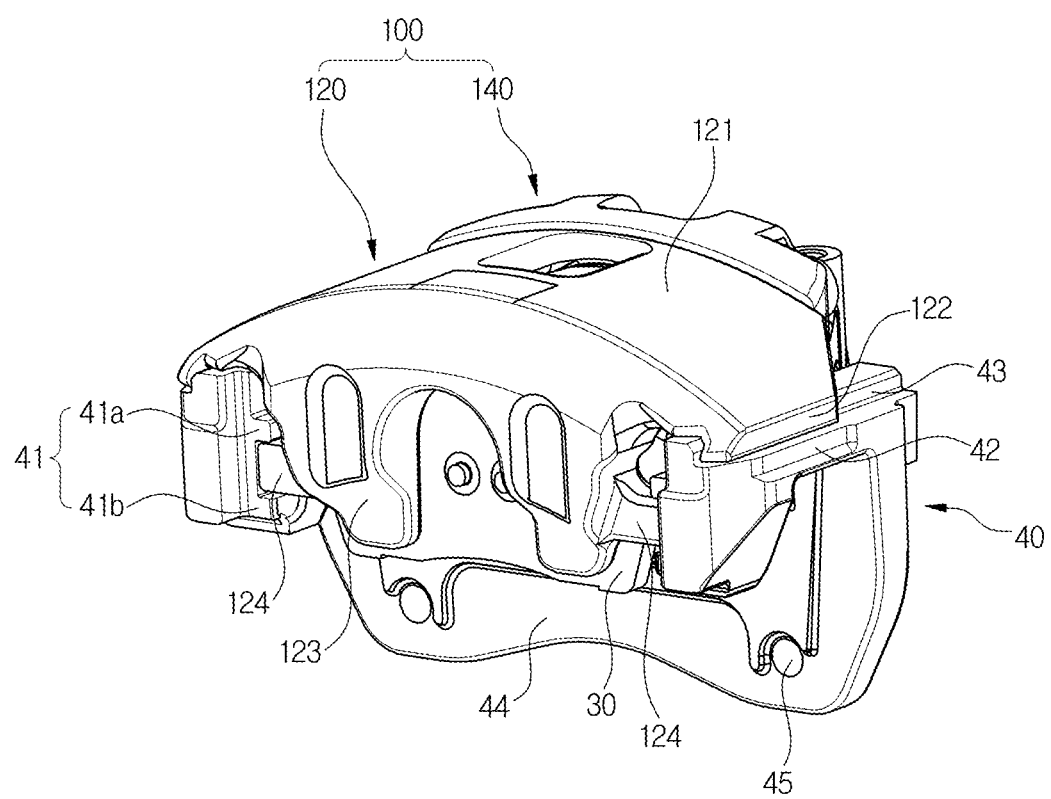

【Fig. 3】
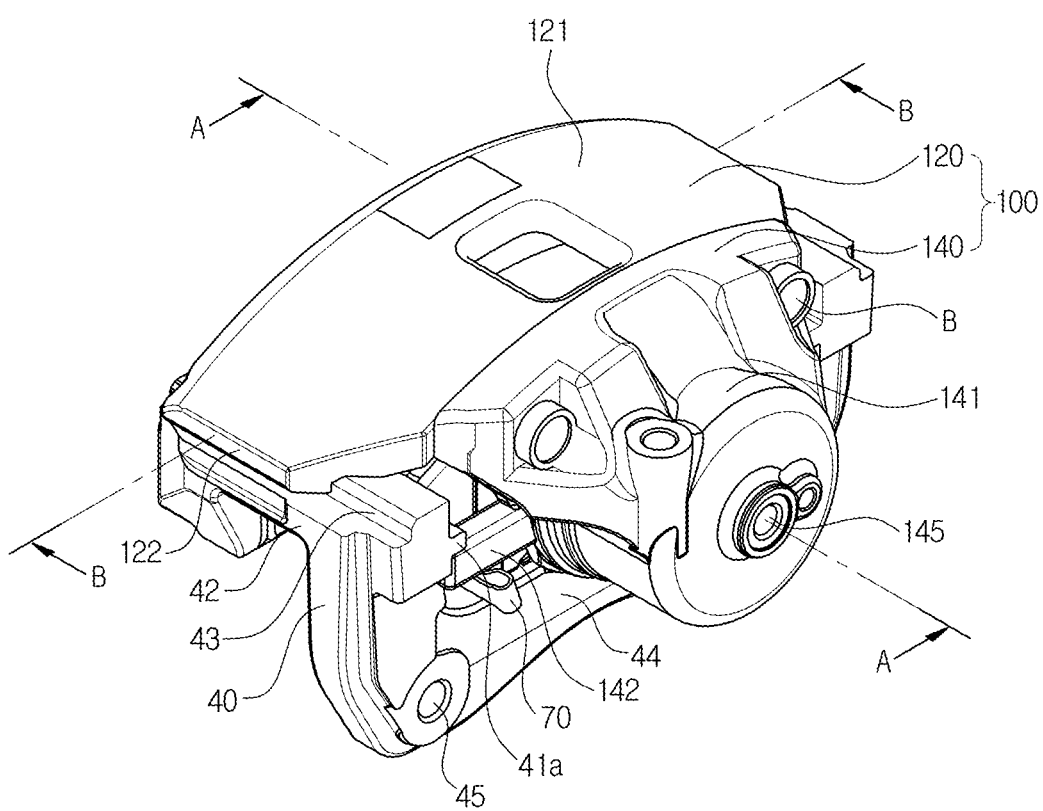

[Fig. 4]
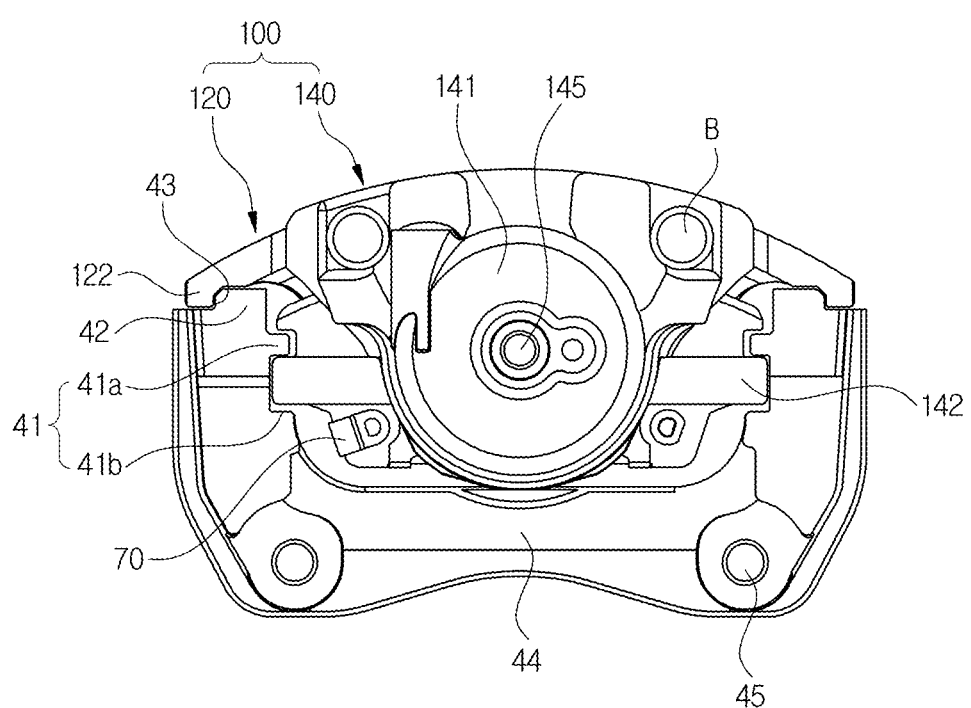

[Fig. 5]
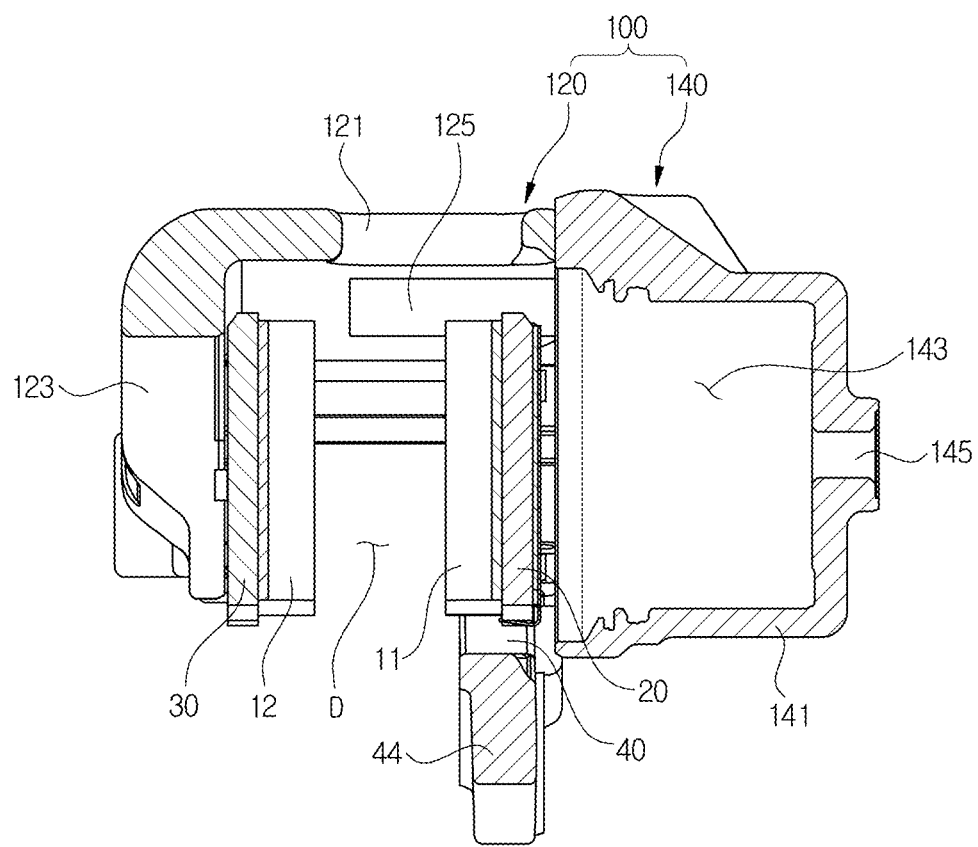

[Fig. 6]
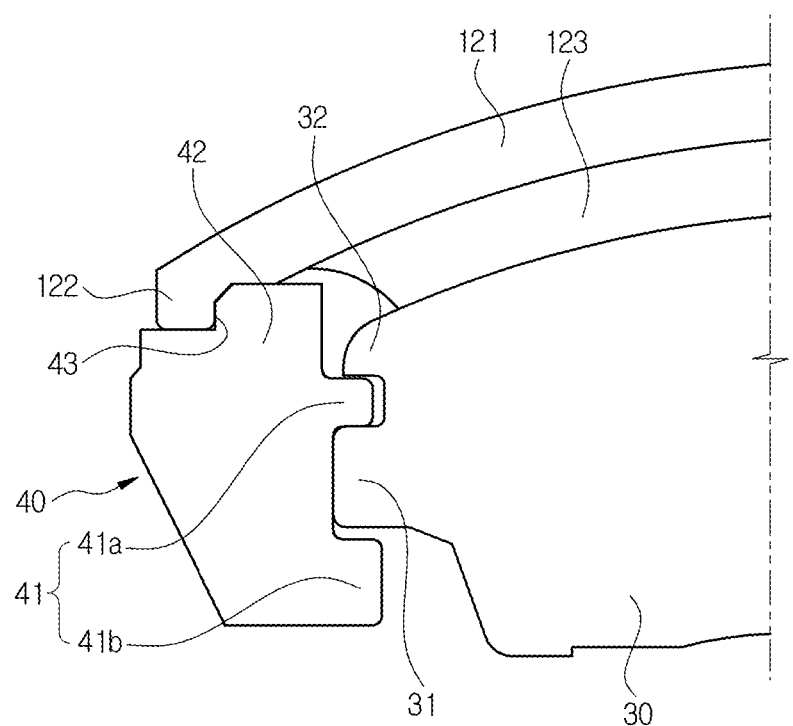

[Fig. 7]
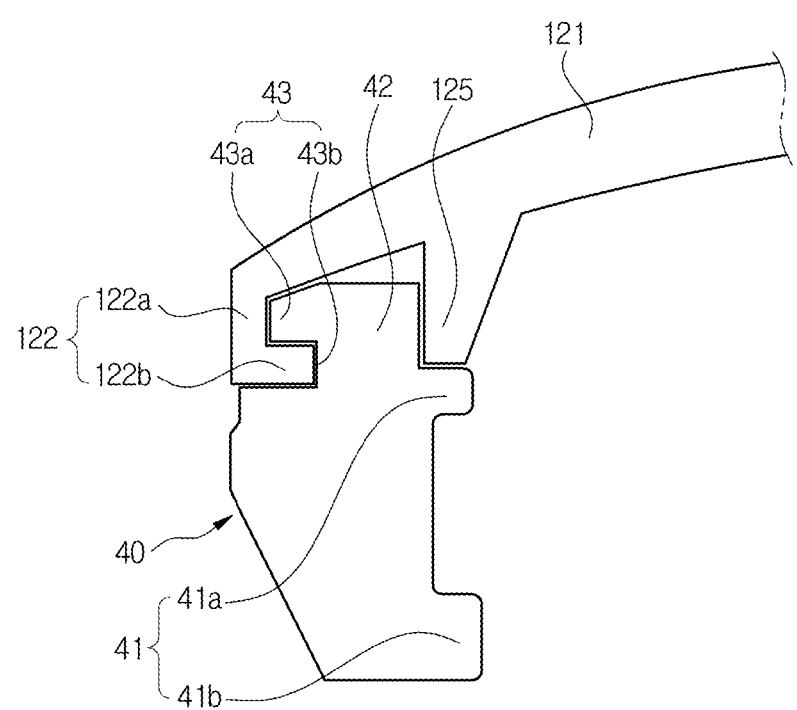

[Fig. 8]
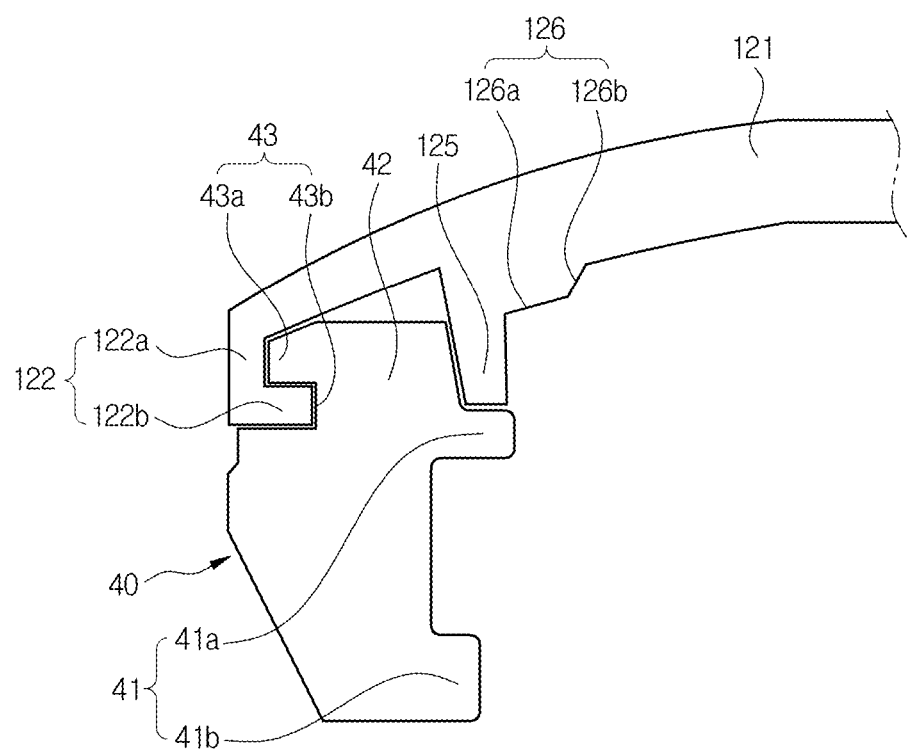

CALIPER BRAKE

CROSS-REFERENCE TO RELATED APPLICATION(S)

This application is based on and claims priority under 35 U.S.C. § 119 to Korean Patent Application No. 10-2020-0001047, filed on Jan. 3, 2020, in the Korean Intellectual Property Office, the disclosure of which is incorporated by reference herein in its entirety.

BACKGROUND

1. Field

The disclosure relates to a caliper brake, and more particularly, to a caliper brake configured to enable sliding of a caliper housing with a simple structure.

2. Description of the Related Art

A typical caliper brake includes a disk rotating together with a wheel of a vehicle, a carrier on which a pair of pad plates are mounted to advance and retreat so as to press the disk, a housing a housing provided with a cylinder slidably mounted on the carrier and in which a piston is installed to advance and retreat by hydraulic pressure of a braking fluid such as brake oil, a spindle unit provided to press the piston, a motor and a reducer as an actuator that transmits a rotational force to the spindle unit, and the like.

This caliper brake performs braking by pressing the piston using the hydraulic pressure of the braking fluid, or performs braking by converting a rotational force provided from the motor into a linear motion by a nut member and a spindle member of the spindle unit and by pressing the piston.

In a conventional caliper brake, lug portions are provided at opposite ends of a housing, each of the lug portions is provided with a guide rod that allows the housing to be slidably coupled to a carrier, and sliding holes into which the guide rods are slidably inserted into positions corresponding to the guide rods are provided at opposite side ends of the carrier, respectively. Therefore, a relatively complex structure is required for the housing to be slidably coupled to the carrier, and separate components such as guide rods are required, which is disadvantageous in terms of component cost and production cost.

Korean Patent Publication No. 10-2015-0128273 (published on Nov. 18, 2015) has been disclosed as an example of a conventional caliper brake.

SUMMARY

It is an aspect of the disclosure to provide a caliper brake configured to enable sliding of a caliper housing with a simple structure.

It is another aspect of the disclosure to provide a caliper brake configured such that a caliper housing surrounds opposite side ends of a carrier to prevent deformation of the carrier.

Additional aspects of the disclosure will be set forth in part in the description which follows and, in part, will be obvious from the description, or may be learned by practice of the disclosure.

In accordance with an aspect of the disclosure, a caliper brake includes a carrier on which a pair of pad plates composed of an inner pad plate and an outer pad plate is mounted to advance and retreat, and a caliper housing slidably mounted on the carrier and provided with a cylinder part in which a piston is installed to be advance and retreat by a braking hydraulic pressure, a finger part bent downward for pressing of the outer pad plates, and a body part connecting the cylinder part and the finger part, wherein the body part is configured to surround opposite side ends of the carrier and provided with a guide part guiding the caliper housing to slide on the carrier.

The carrier may be provided with a connection beam supporting the pair of pad plates, and the connection beam may be provided with a sliding part having a shape corresponding to the guide part and being in contact with the guide part.

The sliding part may protrude upward from an upper surface of the connection beam so that a step is formed, and the guide part may be configured such that a lower side thereof is in contact with a portion of the upper surface of the connection beam and an inner side thereof is in contact with the sliding part of the connection beam.

The sliding part may include a projection portion protruding upward from an upper surface of the connection beam and a bent portion bent outward of the carrier from the projection portion, and the guide part may include an extension portion extending downward from the body part and an insertion portion bent inside the body part from the extension portion to be inserted between a lower surface of the bent portion and an upper surface of the connection beam.

The carrier may be provided with a connection beam supporting the pair of pad plates, and the connection beam may be provided with sliding grooves into which protrusions formed on opposite sides of the pair of pad plates are inserted.

The finger part may be provided with a first flange protruding to be inserted into the sliding groove and to advance and retreat in the sliding groove.

The cylinder part may be provided with a second flange protruding to be inserted into the sliding groove and to advance and retreat in the sliding groove.

The carrier may include a main beam provided with a knuckle hole for fixing the carrier to a vehicle body and a pair of connection beams connected to the main beam to support the pair of pad plates, the connection beam may be provided with sliding grooves formed at front and rear portions thereof and into which protrusions formed on opposite sides of the pair of pad plates are inserted, respectively, the finger part may be provided with a first flange provided to be inserted into the sliding groove formed at the front portion of the connection beam, the cylinder part may be provided with a second flange provided to be inserted into the sliding groove formed at the rear portion of the connection beam, and the sliding groove of the connection beam, the first flange and the second flange may be disposed in parallel.

The body part may be provided with a support flange interposed between an inner side of the carrier and outer sides of the pair of pad plates and protruding downward.

The support flange may be configured such that one side thereof is supported by the inner side of the carrier and the other side opposite to the one side supports the outer side of the pair of pad plates.

The body part may further include a rigidity reinforcing portion provided to reinforce rigidity between the body part and the support flange.

In accordance with another aspect of the disclosure, a caliper brake includes a carrier on which a pair of pad plates composed of an inner pad plate and an outer pad plate is mounted to advance and retreat, and a caliper housing slidably mounted on the carrier and provided with a cylinder part in which a piston is installed to be advance and retreat by a braking hydraulic pressure and a finger part bent downward for pressing of the outer pad plates, wherein the caliper housing is provided with a guide part configured to support opposite side ends of the carrier to be slidable on the carrier, and the caliper brake further includes a flange provided on at least one of the finger part and the cylinder part and protruding to be fastened to a sliding groove formed on the carrier.

In accordance with another aspect of the disclosure, a caliper brake includes a carrier on which a pair of pad plates composed of an inner pad plate and an outer pad plate is mounted to advance and retreat, and a caliper housing slidably mounted on the carrier, wherein the caliper housing is composed of a first caliper housing and a second caliper housing, the first caliper housing includes a body part provided with a guide part supporting opposite side ends of the carrier to be slidable on the carrier, and a finger part bent downward from the body part for pressing of the outer pad plates, the second caliper housing includes a cylinder part in which a piston is installed to be advance and retreat by a braking hydraulic pressure, and the caliper brake further includes a fastening member configured to couple the first caliper housing and the second caliper housing.

The caliper brake may further include a flange provided on at least one of the finger part and the cylinder part and protruding to be fastened to a sliding groove formed on the carrier.

The body part may be provided with a support flange protruding downward toward a sliding groove of the carrier and interposed between an inner side of the carrier and outer sides of the pair of pad plates.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is an exploded perspective view of a caliper brake according to an embodiment of the disclosure;

FIG. 2 is a front perspective view of the caliper brake according to an embodiment of the disclosure;

FIG. 3 is a rear perspective view of the caliper brake according to an embodiment of the disclosure;

FIG. 4 is a rear view of the caliper brake according to an embodiment of the disclosure;

FIG. 5 is a cross-sectional view taken along line A-A in Fla 3;

FIG. 6 is a cross-sectional view taken along line B-B in FIG. 3;

FIG. 7 is a cross-sectional view of a support flange according to an embodiment of the disclosure; and FIG. 8 is a cross-sectional view of the support flange and a rigidity reinforcing portion according to an embodiment of the disclosure.

DETAILED DESCRIPTION

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

As illustrated in FIGS. 1 to 3, a caliper brake according to an embodiment of the disclosure includes a carrier 40 on which a pair of pad plates 20 and 30 composed of the inner pad plate 20 and the outer pad plate 30 are mounted to advance and retreat, and a caliper housing 100 slidably mounted on the carrier 40 and provided with a cylinder part 141 in which a piston (not shown) is installed to be advance and retreat by a braking hydraulic pressure, a finger part 123 bent downward for pressing of the outer pad plate 30, and a body part 121 connecting the cylinder part 141 and the finger part 123. The body part 121 may be configured to surround opposite side ends of the carrier 40 and provided with a guide part 122 for guiding the caliper housing 100 to slide on the carrier 40.

The pair of pad plates 20 and 30 are composed of the inner pad plate 20 disposed to be in contact with the piston and the outer pad plate 30 disposed to be in contact with the finger part 123 of the caliper housing 100. The pair of pad plates 20 and 30 are mounted on the carrier 40 fixed to a vehicle body to advance and retreat toward and from opposite sides of a disk (not shown), and friction pads 11 and 12 are attached to inner surfaces of the pair of pad plates 20 and 30 to rub against the disk, respectively. The disk rotating together with a wheel may be disposed in a space D between the pair of friction pads 11 and 12 in FIG. 5, and the friction pads 11 and 12 attached to the pair of pad plates 20 and 30 press or release the disk by advancing or retreating to or from the opposite sides of the disk.

The caliper housing 100 is slidably mounted on the carrier 40. More specifically, the caliper housing 100 may include the cylinder part 141 positioned at a rear portion thereof and in which the piston is installed to advance and retreat, the finger part 123 positioned at a front portion thereof and molded to be bent to operate the outer pad plate 30, and the body part 121 connecting the cylinder part 141 and the finger part 123.

The caliper housing 100 may be configured by the cylinder part 141, the finger part 123, and the body part 121 being integrally molded. However, the disclosure is not limited thereto, and as will be described later, the caliper housing 100 may be composed of a first caliper housing 120 and a second caliper housing 140, which are separately molded and then coupled through a fastening member B.

The cylinder part 141 of the caliper housing 100 may be provided with a hydraulic chamber 143 so that the piston may be inserted therein. An oil port (not shown) through which a brake oil is introduced may be formed on one side of the caliper housing 100 so that hydraulic pressure for braking may be applied to the hydraulic chamber 143 inside the cylinder part 141. Accordingly, the brake oil may be introduced through the oil port to press the piston, the inner pad plate 20 in contact with the piston may be pressed toward the disk, and the outer pad plate 30 in contact with the finger part 123 may be pulled toward the disk. Therefore, the inner pad plate 20 and the outer pad plate 30 may press or release the disk by advancing or retreating toward or from the opposite sides of the disk.

The cylinder part 141 may be provided with a sealing member (not shown) to maintain airtightness so that the brake oil does not leak between an inner circumferential surface of the cylinder part 141 and an outer circumferential surface of the piston when the piston is inserted into the hydraulic chamber 143.

The piston is formed in a hollow shape and may be slidably disposed in the hydraulic chamber 143 of the cylinder part 141. Specifically, the piston may advance and retreat in the hydraulic chamber 143 by a power transmission unit (not shown) that receives power from a driving device (not shown). Through this, the piston may press the inner pad plate 20 toward the disk to perform braking. The power transmission unit converts a rotational motion into a linear motion by receiving power from the driving device composed of a motor (not shown) and a reducer (not shown) and may include a spindle member (not shown) and a nut member (not shown) configured such that the piston presses and releases the inner pad plate 20. The reducer may reduce power generated from the motor and transmit the power to the power transmission unit and may be configured in various structures such as a planetary gear assembly. A coupling hole 145 may be formed to pass through one side of a rear portion of the cylinder part 141 so that a space in which the drive device and the power transmission unit are connected may be provided.

The body part 121 is configured to connect the cylinder part 141 and the finger part 123. The body part 121 of the caliper housing 100 may have a wide panel shape to cover an upper portion of the carrier 40. The guide part 122 may be formed on one side of the body part 121. The guide part 122 is configured to surround the opposite side ends of the carrier 40 and may guide the caliper housing 100 to slide on the carrier 40.

In more detail, the carrier 40 includes a main beam 44 provided with a knuckle hole 45 coupled to a vehicle body, and a pair of connection beams 42 provided on opposite sides of the main beam 44 to support the pair of pad plates 20 and 30 on the opposite sides, respectively. The guide part 122 may be configured to extend from a lower side of the body part 121 toward the connection beam 42 of the carrier 40 so as to surround opposite sides of the connection beam 42.

The connection beam 42 may be provided with a sliding part 43 in contact with the guide part 122. The sliding part 43 may be provided in a shape corresponding to the guide part 122. The body part 121 of the caliper housing 100 may slide forward and backward on the sliding part 43 of the carrier 40 while the guide part 122 is in contact with the sliding part 43 of the carrier 40.

Therefore, when the piston presses the inner pad plate 20, the caliper housing 100 slides backward on the sliding part 43 of the carrier 40 due to a reaction force and the finger part 123 slides backward together, thereby pressing the outer pad plate 30 in contact with the finger part 123 toward the disk. When the piston releases the inner pad plate 20, the caliper housing 100 slides forward on the sliding part 43 of the carrier 40 and the finger part 123 slides forward together on the sliding part 43, so that the outer pad plate 30 in contact with the finger part 123 releases the disk.

In more detail, as illustrated in FIG. 4, the sliding part 43 may protrude upward from an upper surface of the connection beam 42 of the carrier 40 so that a step is formed. That is, the sliding part 43 may protrude upward from an inner side of the upper surface of the connection beam 42 close to the center of the carrier 40, thereby forming a step with a non-protruding portion of the upper surface of the connection beam 42. A lower side of the guide part 122 of the caliper housing 100 may be in contact with the non-protruding portion of the upper surface of the connection beam 42, and an inner surface of the guide part 122 facing the center of the carrier 40 may be in contact with the protruding outer surface of the sliding part 43.

Because the disk rotates together with the wheel, when the pair of pad plates 20 and 30 seize the opposite sides of the disk with a frictional force, the pair of pad plates 20 and 30 press the carrier 40 by the frictional force. Therefore, a force pressing the carrier 40 along a rotation direction of the disk is generated, and the carrier 40 may be deformed or damaged by repeated brake operation. The caliper brake of the disclosure may prevent the carrier 40 from being deformed because the guide part 122 covers opposite side ends of the connection beam 42 of the carrier 40 to support the carrier 40. That is, the guide part 122 may support the carrier 40 when the carrier 40 is pressed by the pair of pad plates 20 and 30, so that the carrier 40 may be prevented from being excessively deformed.

As illustrated in FIGS. 7 and 8, the sliding part 43 may include a projection portion 43b protruding upward from an upper surface of the connection beam 42 and a bent portion 43a bent outward of the carrier 40 from the projection portion 43b. The guide part 122 may include an extension portion 122a extending downward from the body part 121 and an insertion portion 122b bent inside the body part 121 from the extension portion 122a to be inserted between a lower surface of the bent portion 43a and the upper surface of the connection beam 42 by being bent inward of the body part 121 from the extension portion 122a. The insertion portion 122b of the guide part 122 is inserted between the bent portion 43a of the sliding part 43 and the upper surface of the connection beam 42 and may prevent the caliper housing 100 from being separated from an upper side of the carrier 40 when the caliper housing 100 is mounted on the carrier 40. That is, an upper end of the insertion portion 122b of the guide part 122 may be supported by a lower end of the bent portion 43a of the sliding part 43. Also, because the extension portion 122a of the guide part 122 is configured to surround an outer side and an upper side of the bent portion 43a of the sliding part 43, the guide part 122 may support the carrier 40 when the carrier 40 is pressed by the pair of pad plates 20 and 30, so that the carrier 40 may be prevented from being excessively deformed.

The connection beam 42 of the carrier 40 may be provided with a sliding groove 41 into which protrusions 21 and 31 formed on the opposite sides of the pair of pad plates 20 and 30 are inserted. In more detail, a pair of the sliding grooves 41 may be provided at a front portion and a rear portion of the connection beam 42, respectively. The protrusion 31 of the outer pad plate 30 may be slidably coupled to the sliding groove 41 formed at the front portion of the connection beam 42, and the protrusion 21 of the inner pad plate 20 may be slidably coupled to the sliding groove 41 formed at the rear portion of the connection beam 42.

The sliding groove 41 of the disclosure may be provided by a groove-shaped space formed between an upper flange 41a protruding from the connection beam 42 of the carrier 40 and a lower flange 41b protruding from below the upper flange 41a. However, the sliding groove 41 does not necessarily needs to include the upper flange 41a and the lower flange 41b protruding as shown in the drawings, and the sliding groove 41 may have various structures as long as a space in which the protrusions 21 and 31 of the pad plates 20 and 30 may slide is provided.

The caliper brake of the disclosure may further include a first flange 124 provided on the finger part 123. The first flange 124 may protrude to be inserted into the sliding groove 41 of the carrier 40 and to advance and retreat in the sliding groove 41. The first flange 124 is formed to extend outward from each of the pair of finger parts 123, and the extending first flange 124 may be disposed between the upper flange 41a and the lower flange 41b of the sliding groove 41 provided at the front portion of the connection beam 42 of the carrier 40. Accordingly, upper and lower portions of the first flange 124 of the finger part 123 may be supported by the upper flange 41a and the lower flange 41b of the connection beam 42, respectively. When the caliper housing 100 slides by braking and releasing the braking, the first flange 124 of the finger part 123 may slide together in the sliding groove 41 of the carrier 40.

The finger part 123 may be formed to be bent downward from the body part 121, and a pair of the finger parts 123 may be provided as illustrated in the drawings. However, the disclosure is not limited to being provided with a pair of the finger parts 123, and one the finger part 123 or three or more of the finger parts 123 may be provided. When one of the finger part 123 is provided, the first flange 124 may be formed to extend to opposite sides of the finger part 123, and when three or more of the finger parts 123 are provided, a pair of the first flanges 124 may be formed to extend outward from the outermost sides of the finger part 123, respectively.

The caliper brake of the disclosure may further include a second flange 142 provided on the cylinder part 141. The second flange 142 protrudes to be inserted into the sliding groove 41 of the carrier 40 and to advance and retreat in the sliding groove 41. The second flange 142 is formed to extend outward from cylinder part 141, and the extending second flange 142 may be disposed between the upper flange 41a and the lower flange 41b of the sliding groove 41 provided at the rear portion of the connection beam 42. Accordingly, upper and lower portions of the second flange 142 of the cylinder part 141 may be supported by the upper flange 41a and the lower flange 41b of the connection beam 42, respectively. When the caliper housing 100 slides by braking and releasing the braking, the second flange 142 of the cylinder part 141 may slide together in the sliding groove 41 of the carrier 40.

The carrier 40 may include the main beam 44 provided with the knuckle hole 45 for fixing the carrier 40 to the vehicle body, and the connection beam 42 connected to the main beam 44 and supporting the pair of pad plates 20 and 30, the sliding grooves 41 into which the protrusions 21 and 31 formed on the opposite sides of the pair of pad plates 20 and 30 are inserted may be provided at the front and rear portions of the connection beam 42, respectively, the finger part 123 may be provided with the first flange 124 formed to be inserted into the sliding groove 41 provided at the front portion of the connection beam 42, and the cylinder part 141 may be provided with the second flange 142 formed to be inserted into the sliding groove 41 provided at the rear portion of the connection beam 42. The sliding groove 41, the first flange 124 and the second flange 142 formed at the front and rear portions of the connection beam 42, respectively, may be disposed in parallel.

As illustrated in FIGS. 7 and 8, the body part 121 may include a support flange 125 interposed between an inner side of the connection beam 42 of the carrier 40 and an outer side of the pair of pad plates 20 and 30 and protruding downward. In more detail, the support flange 125 may be configured such that one side thereof is supported by an inner side of the sliding part 43 and the other side thereof supports the outer side of the pad plates 20 and 30.

Accordingly, when the pad plates 20 and 30 are pressed and rotated by the disk, the protrusions 21 and 31 of the pad plates 20 and 30 may be supported by the sliding groove 41, and outer sides of an upper portion of the pad plates 20 and 30 may be supported by the support flange 125. Therefore, when the pad plates 20 and 30 are pressed in a rotational direction of the disk, various load pass paths may be formed, and a force of the pad plates 20 and 30 pressing the carrier 40 is not concentrated on any one of the carrier 40, so that deformation of the carrier 40 may be prevented.

A pair of the support flanges 125 may be arranged to be spaced apart from each other so as not to interfere with the disk. The pair of support flanges 125 are provided to face each other and may protrude from the body part 121 to support the inner pad plate 20 and the outer pad plate 30, respectively. Unlike this, only one of the support flange 125 may be provided, and in this case, the support flange 125 may protrude to support the inner pad plate 20 or may protrude to support the outer pad plate 30.

The body part 121 may further include a rigidity reinforcing portion 126. The rigidity reinforcing portion 126 may be provided between the body part 121 and the support flange 125. As illustrated in FIG. 8, the rigidity reinforcing portion 126 may include a first reinforcing surface 126a formed to be inclined upward from an inner side of the support flange 125 and a second reinforcing surface 126b formed to be steeper than the first reinforcing surface 126a.

As the support flange 125 is provided to protrude downward from the body part 121, the support flange 125 may be worn or deformed due to repeated pressing and releasing of the pad plates 20 and 30. However, the rigidity reinforcing portion 126 for reinforcing a coupling rigidity is provided between the inner side of the support flange 125 and the body part 121, so that the deformation of the support flange 125 may be prevented. The first reinforcing surface 126a and the second reinforcing surface 126b may support one side of the pad plates 20 and 30 depending on various shapes of the pad plates 20 and 30, and may allow the force of the pad plates 20 and 30 pressing the carrier 40 to be distributed through various load pass paths.

As described above, the caliper brake of the disclosure may include the carrier 40 in which the pair of pad plates 20 and 30 composed of the inner pad plate 20 and the outer pad plate 30 are mounted to advance and retreat, and the caliper housing 100 slidably mounted on the carrier 40 and provided with the cylinder part 141 in which the piston is installed to advance and retreat by a braking hydraulic pressure and the finger part 123 bent downward for pressing of the outer pad plate 30, and the caliper housing 100 may be provided with the guide part 122 supporting the opposite side ends of the carrier 40 to be slidable on the carrier 40. The caliper brake may further include the flanges 124 and 142 provided on at least one of the finger part 123 and the cylinder part 141. That is, the finger part 123 may be provided with the first flange 124 protruding to be fastened to the sliding groove 41 formed at the front portion of the carrier 40 or the cylinder part 141 may be provided with the second flange 142 protruding to be fastened to the sliding groove 41 formed at the rear portion of the carrier 40. Also, the finger part 123 and the cylinder part 141 may be provided with the first flange 124 and the second flange 142, respectively, to be fastened to the sliding grooves 41 formed at the front and rear portions of the carrier 40.

The caliper brake of the disclosure may further include a pad spring (not shown) interposed between the carrier 40 and the flanges 124 and 142. The pad spring may be fixed to the sliding groove 41 of the carrier 40 and may guide the pad plates 20 and 30 and the flanges 124 and 142 of the caliper housing 100 to slide smoothly. That is, the protrusions 21 and 31 of the pad plates 20 and 30 are inserted into the pad spring to facilitate smooth movement of the pad plates 20 and 30 and prevent vibration of the pad plates 20 and 30 when a vehicle is vibrating, and the pad spring may support the first flange 124 or the second flange 142 of the caliper housing 100 to smoothly slide in the sliding groove 41.

As described above, the caliper housing 100 of the disclosure may be configured by the cylinder part 141, the finger part 123, and the body part 121 being integrally molded. Unlike this, as will be described later, the caliper housing 100 of the disclosure may be composed of the separate first and second caliper housing 120 and 140.

The caliper housing 100 may be composed of the first caliper housing 120 and the second caliper housing 140. In this case, the first caliper housing 120 may include the body part 121 having the guide part 122 supporting the opposite side ends of the carrier 40 to be slidable on the carrier 40, and the finger part 123 bent downward from the body part 121 to press the outer pad plate 30. The second caliper housing 140 may include the cylinder part 141 in which the piston is installed to advance and retreat by a braking hydraulic pressure. The carrier 40, the guide part 122, the body part 121, the finger part 123, and the cylinder part 141 are the same as described above, and thus a description thereof will be omitted.

The fastening member B may be provided to couple the first caliper housing 120 and the second caliper housing 140. In more detail, the first and second caliper housings 120 and 140 may be provided with first and second through holes 125 and 144, respectively, to which the fastening member B is fastened.

A pair of the second through holes 144 may be provided on opposite sides of the cylinder part 141 of the second caliper housing 140, and the fastening member B may be inserted into the second through holes 144. The first through hole 125 may be provided on the body part 121 of the first caliper housing 120 to be positioned coaxially with the second through hole 144, and the fastening member B may be inserted into the first through hole 125.

In more detail, the fastening member B is provided as a bolt and may be screwed to the first and second through holes 125 and 144. That is, the fastening member B may have a threaded portion, and the first and second through holes 125 and 144 may have a threaded portion in a shape corresponding to the threaded portion of the fastening member B. As the fastening member B is inserted into the first through hole 125 and the second through hole 144 and screwed to the first and second through holes 125 and 144, the first caliper housing 120 and the second caliper housing 140 may be coupled to each other. However, the disclosure is not limited to the fastening member B composed of a bolt, and may be provided in various structures such as pins and rods capable of coupling the first and second caliper housings 120 and 140.

The caliper brake of the disclosure may be provided in at least one of the finger part 123 of the first caliper housing 120 and the cylinder part 141 of the second caliper housing 140 and may further include the first and second flanges 124 and 142 protruding to be fastened to the sliding grooves 41 formed on the carrier 40.

That is, the finger part 123 of the first caliper housing 120 may be provided with the first flange 124 protruding to be fastened to the sliding groove 41 formed at the front portion of the carrier 40 or the cylinder part 141 of the second caliper housing 140 may be provided with the second flange 142 protruding to be fastened to the sliding groove 41 formed at the rear portion of the carrier 40. Also, the finger part 123 of the first caliper housing 120 and the cylinder part 141 of the second caliper housing 140 may be provided with the first flange 124 and the second flange 142, respectively, to be fastened to the sliding grooves 41 formed at the front and rear portions of the carrier 40.

The body part 121 of the first caliper housing 120 may include the support flange 125 protruding downward toward the sliding groove 41 of the carrier 40 and interposed between an inner side of the carrier 40 and an outer side of the pair of pad plates 20 and 30. The support flange 125 is the same as described above, and thus a description thereof will be omitted.

The caliper brake of the disclosure may further include a wear detection sensor 70. The wear detection sensor 70 may be provided on the inner pad plate 20, may be provided on the outer pad plate 30, or may be provided on both the inner pad plate 20 and the outer pad plate 30. The wear detection sensor 70 may be configured to detect a degree of wear of the pad plates 20 and 30 or the friction pads 11 and 12 due to repeated operation and release of a brake.

The caliper brake of the disclosure may further include a cover shim (not provided with reference numeral) installed on the pair of pad plates 20 and 30 and having a predetermined thickness. A pair of the cover shim may be provided, may be interposed between the inner pad plate 20 and the piston, and may be interposed between the outer pad plate 30 and the finger part 123. The cover shim may reduce the noise generated when the pad plates 20 and 30 press the disk for braking and may prevent friction heat and braking noise due to friction between the disk and the friction pads 11 and 12 during braking from being transmitted to the caliper housing 100 through the piston and finger part 123.

As is apparent from the above, according to an embodiment of the disclosure, a caliper brake configured to enable sliding of a caliper housing with a simple structure can be provided.

Further, the caliper brake according to an embodiment of the disclosure can prevent deformation of the carrier by the caliper housing configured to surround opposite side ends of a carrier.

Further, the caliper brake according to an embodiment of the disclosure can provide various load pass paths by including a support flange configured to support a pad plate.

While the disclosure has been particularly described with reference to exemplary embodiments, it should be understood by those of skilled in the art that various changes in form and details may be made without departing from the spirit and scope of the disclosure.

What is claimed is:
1. A caliper brake comprising:
a carrier on which a pair of pad plates composed of an inner pad plate and an outer pad plate is mounted to advance and retreat; and
a caliper housing slidably mounted on the carrier and provided with a cylinder part in which a piston is installed to be advance and retreat by a braking hydraulic pressure, a finger part bent downward for pressing of the outer pad plates, and a body part connecting the cylinder part and the finger part, wherein
the body part is configured to surround opposite side ends of the carrier and provided with a guide part guiding the caliper housing to slide on the carrier, and
the body part is provided with support flange interposed between an inner side of the carrier and outer sides of the pair of pad plates and protruding downward.
2. The caliper brake according to claim 1, wherein:
the carrier is provided with a connection beam supporting the pair of pad plates; and the connection beam is provided with a sliding part having a shape corresponding to the guide part and being in contact with the guide part.

3. The caliper brake according to claim 2, wherein:
the sliding part protrudes upward from an upper surface of the connection beam so that a step is formed; and
the guide part is configured such that a lower side thereof is in contact with a portion of the upper surface of the connection beam and an inner side thereof is in contact with the sliding part of the connection beam.

4. The caliper brake according to claim 2, wherein:
the sliding part comprises a projection portion protruding upward from an upper surface of the connection beam and a bent portion bent outward of the carrier from the projection portion; and
the guide part comprises an extension portion extending downward from the body part and an insertion portion bent inside the body part from the extension portion to be inserted between a lower surface of the bent portion and an upper surface of the connection beam.

5. The caliper brake according to claim 1, wherein:
the carrier is provided with a connection beam supporting the pair of pad plates; and
the connection beam is provided with sliding grooves into which protrusions formed on opposite sides of the pair of pad plates are inserted.

6. The caliper brake according to claim 5, wherein the finger part is provided with a first flange protruding to be inserted into the sliding groove and to advance and retreat in the sliding groove.

7. The caliper brake according to claim 5, wherein the cylinder part is provided with a second flange protruding to be inserted into the sliding groove and to advance and retreat in the sliding groove.

8. The caliper brake according to claim 1, wherein:
the carrier comprises a main beam provided with a knuckle hole for fixing the carrier to a vehicle body and a pair of connection beams connected to the main beam to support the pair of pad plates;
the connection beam is provided with sliding grooves formed at front and rear portions thereof and into which protrusions formed on opposite sides of the pair of pad plates are inserted, respectively;
the finger part is provided with a first flange provided to be inserted into the sliding groove formed at the front portion of the connection beam;
the cylinder part is provided with a second flange provided to be inserted into the sliding groove formed at the rear portion of the connection beam; and
the sliding groove of the connection beam, the first flange and the second flange are disposed in parallel.

9. The caliper brake according to claim 1, wherein the support flange is configured such that one side thereof is supported by the inner side of the carrier and the other side opposite to the one side supports the outer side of the pair of pad plates.

10. The caliper brake according to claim 1, wherein the body part further comprises a rigidity reinforcing portion provided to reinforce rigidity between the body part and the support flange.

11. A caliper brake comprising:
a carrier on which a pair of pad plates composed of an inner pad plate and an outer pad plate is mounted to advance and retreat; and
a caliper housing slidably mounted on the carrier and provided with a cylinder part in which a piston is installed to be advance and retreat by a braking hydraulic pressure, a finger part bent downward for pressing of the outer pad plates and a body part connecting the cylinder part and the finger part, wherein:
the caliper housing is provided with a guide part configured to support opposite side ends of the carrier to be slidable on the carrier;
the caliper brake further comprises a flange provided on at least one of the finger part and the cylinder part and protruding to be fastened to a sliding groove formed on the carrier, and
the body part is provided with a support flange protruding downward toward a sliding groove of the carrier and interposed between an inner side of carrier and outer sides of the pair of pad plates.

12. A caliper brake comprising:
a carrier on which a pair of pad plates composed of an inner pad plate and an outer pad plate is mounted to advance and retreat; and
a caliper housing slidably mounted on the carrier, wherein:
the caliper housing is composed of a first caliper housing and a second caliper housing;
the first caliper housing comprises a body part provided with a guide part supporting opposite side ends of the carrier to be slidable on the carrier, and a finger part bent downward from the body part for pressing of the outer pad plates;
the second caliper housing comprises a cylinder part in which a piston is installed to be advance and retreat by a braking hydraulic pressure;
the caliper brake further comprises a fastening member configured to couple the first caliper housing and the second caliper housing, and
the body part is provided with a support flange protruding downward toward a sliding groove of the carrier and interposed between an inner side of the carrier and outer sides of the pair of pad plates.

13. The caliper brake according to claim 12, further comprising
a flange provided on at least one of the finger part and the cylinder part and protruding to be fastened to a sliding groove formed on the carrier.

* * * * *